US011803001B1

(12) United States Patent
Essinger-Hileman et al.

(10) Patent No.: US 11,803,001 B1
(45) Date of Patent: Oct. 31, 2023

(54) OPTICAL FILTER HAVING POLYIMIDE AEROGEL SUBSTRATE AND INFRARED RADIATION SCATTERING PARTICLES

(71) Applicant: United States of America as represented by the Administrator of NASA, Washington, DC (US)

(72) Inventors: Thomas M. Essinger-Hileman, Odenton, MD (US); Mary Ann Meador, Johns Island, SC (US); Haiquan Guo, Avon, OH (US); Tobias Marriage, Baltimore, MD (US); Charles L. Bennett, Bethesda, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 468 days.

(21) Appl. No.: 16/874,126

(22) Filed: May 14, 2020

Related U.S. Application Data

(60) Provisional application No. 62/848,083, filed on May 15, 2019.

(51) Int. Cl.
  *G02B 5/02* (2006.01)
  *G02B 5/20* (2006.01)

(52) U.S. Cl.
  CPC .......... *G02B 5/208* (2013.01); *G02B 5/0242* (2013.01); *G02B 5/0268* (2013.01); *G02B 5/0294* (2013.01); *G02B 5/0247* (2013.01); *G02B 5/206* (2013.01); *G02B 5/207* (2013.01); *G02B 2207/107* (2013.01); *G02B 2207/109* (2013.01)

(58) Field of Classification Search
  CPC .. G02B 5/0242; G02B 5/0247; G02B 5/0268; G02B 5/0294; G02B 5/206; G02B 5/207; G02B 5/208; G02B 2207/107; G02B 2207/109
  See application file for complete search history.

(56) References Cited

U.S. PATENT DOCUMENTS

| 8,067,478 | B1 * | 11/2011 | Meador ............... C08F 230/085 |
| | | | 521/154 |
| 8,974,903 | B2 | 3/2015 | Meador et al. |
| 9,109,088 | B2 | 8/2015 | Meador et al. |
| 9,309,369 | B1 | 4/2016 | Meador |
| 9,315,632 | B1 | 4/2016 | Meador |
| 9,434,832 | B1 | 9/2016 | Meador |
| 9,650,487 | B1 | 5/2017 | Guo et al. |
| 10,011,719 | B1 | 7/2018 | Meador et al. |

(Continued)

*Primary Examiner* — Ryan S Dunning
(74) *Attorney, Agent, or Firm* — Heather Goo; Matthew F. Johnston; Trenton J. Roche (57) ABSTRACT

The present invention relates to broadband and tunable infrared (IR)-blocking optical filters for millimeter and sub-millimeter astronomy composed of small diffusely scattered particles embedded in an aerogel substrate. The size of the scattering particles included in the aerogel filters can be tuned to give variable cutoff frequencies. In one embodiment, the aerogel scattering optical filters of the present invention have ultra-low density and index of refraction (typically $n<1.15$), removing the need for anti-reflection coatings that limit bandwidth and increase filter complexity, and allowing for high transmission across an ultra-broad band from zero frequency to above 1 THz, and as much as 10 THz.

28 Claims, 3 Drawing Sheets

(56) References Cited

U.S. PATENT DOCUMENTS

| | | |
|---|---|---|
| 10,066,073 B1 | 9/2018 | Williams et al. |
| 10,150,848 B2 | 12/2018 | Nguyen et al. |
| 10,227,469 B1 | 3/2019 | Williams et al. |
| 10,358,539 B1 | 7/2019 | Meador |
| 10,428,181 B2 | 10/2019 | Meador et al. |
| 2009/0087665 A1* | 4/2009 | Suzuki ............... C01B 33/1585 428/428 |
| 2013/0202890 A1* | 8/2013 | Kong ................ B01J 20/0233 252/502 |
| 2014/0044929 A1* | 2/2014 | Evans ................... C04B 35/82 428/196 |
| 2018/0009997 A1* | 1/2018 | Bhagwagar .......... C09D 183/06 |
| 2020/0269207 A1* | 8/2020 | Zafiropoulos ........... C01B 32/00 |

* cited by examiner

|   | Dimensions | Aerogel Material | Aerogel Density | Si Part. Sizes | Si Part. Density | Model $n$ | Meas. $n$ |
|---|---|---|---|---|---|---|---|
|   | mm |   | mg/cm³ | µm | mg/cm³ |   |   |
| 1 | 3 x 50 x 50 | Silica | 90 | None | N/A | 1.03 | 1.04 |
| 2 | 3 x 50 x 50 | Silica | 90 | 60-75 | 35 | 1.04 | 1.07 |
| 3 | 3 x 50 x 50 | Silica | 90 | 60-75 | 17 | 1.03 | 1.06 |
| 4 | 12.5 x 50 x 50 | Silica | 90 | 75-100 | 35 | 1.04 | _1 |
| 5 | 0.3 x 420 x 2000 | Polyimide 1 | 212 | None | N/A | 1.09 | 1.10 |
| 6 | 0.5 x 420 x 2000 | Polyimide 1 | 178 | 50-75 | 3 | 1.07 | 1.08 |
| 7 | 0.3 x 420 x 2000 | Polyimide 1 | 204 | 75-100 | 5 | 1.09 | 1.13 |
| 8 | 1.0 x 25 x 25 | Polyimide 2 | 125 | None | N/A | 1.05 | 1.10 |
| 9 | 0.9 x 25 x 25 | Polyimide 2 | 125 | < 30 µm | 50 | 1.08 | 1.11 |
| 10 | 1.2 x 25 x 25 | Polyimide 2 | 125 | < 30 µm | 200 | 1.16 | 1.21 |

OPTICAL FILTER HAVING POLYIMIDE AEROGEL SUBSTRATE AND INFRARED RADIATION SCATTERING PARTICLES

CROSS-REFERENCE TO RELATED APPLICATIONS

The present application claims priority from U.S. Provisional Patent Application No. 62/848,083, filed May 15, 2019, the contents of which are herein incorporated by reference in their entirety.

ORIGIN OF THE INVENTION

The invention described herein was at least in-part made by an employee of the United States Government and may be manufactured or used by or for the Government of the United States of America for governmental purposes without the payment of any royalties thereon or therefor. This invention was made with government support under 0959349 and 1636634 awarded by the National Science Foundation. The government has certain rights in the invention.

BACKGROUND OF THE INVENTION

1. Field of the Invention

The present invention relates to broadband and tunable infrared-blocking optical filters composed of small scattering particles embedded in an aerogel substrate. The ultra-low-density (typically <150 mg/cm$_3$) aerogel substrate provides an index of refraction as low as n=1.04, removing the need for anti-reflection coatings and allowing for broadband operation from a frequency of 0 Hz to above 1 THz.

2. Description of the Related Art

Telescopes operating at millimeter (mm) and sub-millimeter wavelengths are expanding understanding of the universe through observations of the cosmic microwave background (CMB), high-redshift galaxies, and the interstellar and intergalactic media. Physics and cosmology applications demand excellent instrument stability and control of systematic error. Further, observations are increasingly requiring high-throughput systems.

To date no telescope has achieved the combination of sensitivity and stability to make a definitive measurement of polarization signals from cosmic inflation in the CMB, so-called B-mode polarization. In physics and cosmology applications, detecting primordial B modes is one of the most exciting prospects in modern cosmology. A B-mode detection would be a clear signature of the existence of a primordial gravitational wave background, which is generically predicted to exist in the simplest, and therefore most compelling, single-field theories of inflation. Such a detection would give us confidence in inflationary cosmology, identify the energy scale of inflation, distinguish between competing models of inflation, and illuminate physics at energy scales of $10_{15}$-$10_{16}$ GeV.

Achieving the requisite sensitivity to probe the B-mode signal requires thousands of cryogenic detectors with correspondingly large telescope apertures. Mission success will depend critically on the ability of infrared (IR)-blocking optical filters to mitigate the thermal load from frequencies outside of the passbands of the detectors. Such filters must have minimal reflection across a broad microwave frequency range to accommodate the spectral coverage needed to separate the CMB signal from polarized galactic emission.

More specifically, millimeter-wave cryogenic receivers with bolometric detectors require rejection of IR radiation to reduce thermal loads on the cold stages of the cryostat. A key source of thermal loading comes from out-of-band power at IR frequencies entering through the telescope aperture. As detector arrays become larger, telescope apertures correspondingly increase in size, placing tighter constraints on IR blocking. Thus, as telescope apertures increase in diameter to accommodate larger focal planes, the requirements for IR filtering become more stringent, while the fabrication of filters becomes correspondingly more difficult.

Considerable concentration has been placed over the years in improving detector performance. The low-temperature detectors used at these millimeter wavelengths have already succeeded in achieving background-limited sensitivities. The only way to significantly increase the performance of future experiments is therefore to expand to the use of ever-larger arrays of detectors, with correspondingly larger telescope focal planes. This, in turn, places strong demands on other telescope systems, including IR-blocking filters.

This is a particular problem for current-generation CMB receivers, which have apertures approaching 1 meter (m) in diameter. For such large apertures, IR rejection at 1 part in $10_6$ is required to enable operation of the focal plane array at sub-Kelvin (sub-K) temperatures. In order for instruments to meet the requirements, optical filters at diameters of up to 1 m are needed to block out-of-band power, either by: (1) absorbing, (2) reflecting, or (3) scattering it away, while allowing high transmission and low emission of in-band power.

A variety of approaches have been developed to meet this challenge.

To achieve the sensitivity required to detect the small (i.e., nK) CMB polarization signals of interest, low-temperature detectors, most commonly transition-edge sensor (TES) bolometers operating at temperatures as low as 100 mK, are employed. Cryogenic detector arrays offer unprecedented sensitivity, but complicate instrument design. The sub-Kelvin stages of an instrument's receiver can have cooling powers below 10 µW, requiring that every source of thermal loading be carefully controlled. For balloon-borne and satellite instruments, which commonly use liquid cryogens for cooling to 4 K, the total thermal load on the cryogenic system limits the operational lifetime.

Optical filters made of materials that are highly absorptive at IR frequencies but transmissive at millimeter wavelengths have been used by a number of telescopes. While absorptive filters are relatively easy to fabricate, they do not have easily tuned transmission properties and can heat significantly in their centers and re-emit power down the cryogenic chain, especially as filters are produced at larger diameter.

Thus, absorptive filters have been used, in which a material with low loss at millimeter wavelengths but strong absorption or restrahlen reflection in the IR absorbs power and conducts it to higher-temperature stages of a receiver. Materials used for this purpose include polytetrafluoroethylene (PTFE), nylon, and alumina. However, absorbing filters require anti-reflection (AR) coatings and lose effectiveness as their diameter increases, because, as stated above, the centers of the filters tend to heat and re-radiate further down the optical chain. In these absorptive filters, although a stack of absorbing filters can be successfully cooled (~60 K) at the edges, the center remains hot (>100

K). Furthermore, absorptive filters require anti-reflection (AR) coatings that limit filter bandwidth and increase complexity.

Low-refractive-index foam materials have been used, which scatter and absorb IR power due to their pore size, and then radiate some of that absorbed power back out of the receiver; however, typical pore sizes in these foams are generally too large to enable their use at sub-mm or shorter wavelengths.

In other prior art optical filters, those that reject out-of-band power primarily through reflection are also extensively used. Quasi-optical filters using frequency-selective surfaces (FSS) to reject out-of-band power by reflection reduce the amount of heat absorbed and possibly re-emitted by the filters. These filters have widely tunable frequency characteristics, allowing for their use as low pass, high pass, or band pass filters. However, drawbacks are that they are more difficult to fabricate and still need to be patterned on a substrate, often leading to the same materials issues faced with absorptive filters.

Reflective metal-mesh optical filters, composed of patterned metal films on a thin dielectric substrate, have been widely used. Capacitive grids, comprised of two-dimensional grids of metallic squares, provide strong (>30 dB) IR rejection with minimal loss at millimeter wavelengths, though there are diminishing returns when using multiple reflective filters. Power by filters further down the stack reflected by subsequent filters needs to transmit back through the filters further up in the stack to be rejected out of the receiver and the telescope aperture.

Finally, although commonly employed single-layer capacitive grids used for thermal blocking in CMB instruments have low transmission at the grid's resonance frequency, they transmit as much as 40% at other IR wavelengths. This necessitates the use of multiple filters in sequence to get broadband IR rejection.

Thus, a new type of optical filter which can enable a wide variety of science, in addition to CMB observations, ranging from line intensity mapping that will characterize star formation over cosmic time, to measurements of the distribution of water and ice in proto-planetary disks, is needed. The present invention is directed to an aerogel scattering filter with a broad passband, which makes it particularly well suited to the broadband spectroscopy required for the Origins Space Telescope, with operation at the requisite THz frequencies.

SUMMARY OF THE INVENTION

The present invention relates to broadband and tunable IR-blocking optical filters for millimeter (mm) and sub-millimeter astronomy composed of small scattering particles embedded in an aerogel substrate. The ultra-low-density (typically <150 $mg/cm_3$) aerogel substrate provides an index of refraction as low as n=1.03, removing the need for anti-reflection coatings and allowing for broadband operation from a frequency of 0 Hz to above 10 THz.

In one embodiment, the aerogel IR-blocking optical filter of the present invention is fabricated using small scattering particles embedded in an aerogel substrate. The particles are made to diffusely scatter infrared (IR) radiation to a wide range of angles. The ultra-low-density (i.e., 90-212 $mg/cm_3$) aerogel substrate has a low index of refraction n, removing the need for an anti-reflection (AR) coating and allowing for high transmission across an ultra-broadband from zero (0) frequency to greater than 10 THz.

In the present invention, the size of the scattering particles can be tuned to give variable cutoff frequencies. Since the fundamental limit on the highest frequency that the aerogel scattering filters of the present invention can be transmissive, is set by the typical pore size of the aerogels, which is around 10-30 nm, this allows their use at far higher frequencies than THz.

In one embodiment, aerogel materials used for the optical filters includes classic silica aerogel, and in another embodiment, a flexible and mechanically robust polyimide aerogels made with a plurality of different polyimide oligomer backbones, with suitable scattering particles such as those made of silicon, diamond, or any other suitable material. The exemplary silicon and polyimide materials are ideal substrates for the aerogel scattering filters of the present invention, providing a unique combination of low index of refraction, low microwave loss, mechanical robustness, and flexibility that is unmatched.

In one embodiment, the aerogels of the present invention are produced by supercritical drying of gels, typically using carbon dioxide, which allows liquid to be removed from the gel without destroying its solid matrix, leaving behind a low-density nano-porous skeleton with high strength-to-weight ratio and low thermal conductivity.

In one embodiment, the silica aerogel optical filters of the present invention can be produced with embedded high-resistivity silicon powder at a 40-cm diameter to enable large-aperture cryogenic receivers for cosmic microwave background polarimeters, which require large arrays of sub-Kelvin detectors in their search for the signature of an inflationary gravitational wave background.

In one embodiment, the polyimide aerogels of the present invention were made with two different polyimide oligomer backbones. Polyimide 1 was made from 9% w/w polymer concentration, using biphenyl-3,3',4,4'tetracarboxylic dianhydride (BPDA) as dianhydride, the combination of 2,2'-dimethyl benzidine (DMBZ) and 4,4'-oxydianiline (ODA) as diamine, and 3,5-triaminophenoxybenzene (TAB) as a cross-linker. Polyimide 2 was made from 10% w/w polymer concentration, using BPDA as dianhydride, the combination of 4,4'-bis (4-aminophenoxy) biphenyl (BAPB) and DMBZ as diamine, and TAB as a cross-linker.

In one embodiment, the exemplary silica and polyimide aerogel scattering optical filters of the present invention were fabricated to include various particle size distributions. In one embodiment, silica aerogel samples, 12.5 mm×50 mm×50 mm and 3 mm×50 mm×50 mm in size, were successfully fabricated with densities of 90 $mg/cm_3$ and silicon loading of 35 $mg/cm_3$ and 17 $mg/cm_3$ with silicon particle size distributions of 60-75 μm and 75-100 μm, as discussed further below.

In one exemplary polyimide embodiment, a Polyimide 1 aerogel optical filter was produced in rolls 420 mm×2000 cm in thicknesses of 0.3-0.5 mm with silicon loading of 3 and 5 $mg/cm_3$ with particle size distributions of 50-75 μm and 75-100 μm.

In another exemplary polyimide embodiment, a Polyimide 2 aerogel optical filter was produced in smaller coupons of 25 mm×25 mm in size with thicknesses of 0.9-1.2 mm, silicon loading of 50 and 200 $mg/cm_3$, and particle size distribution of <30 μm. Reference samples were also produced for comparison with both exemplary silica and polyimide aerogels.

In one embodiment, the aerogel scattering optical filters of the present invention have ultra-low density and index of refraction (typically n<1.10), removing the need for anti-reflection (AR) coatings that limit bandwidth and increase filter complexity. By choosing the size distribution of the exemplary silicon or polyimide particles embedded as scatterers in the filter, the cutoff frequency of the filter of the present invention is tunable with strong rejection across all frequencies above the cutoff. No other infrared-blocking filter technology provides this combination of bandwidth, IR rejection, and tunable cutoff frequency.

Maximizing the sensitivity of millimeter and sub-millimeter instruments requires rejection of infrared (IR) light. IR-blocking optical filters require ultra-wide bandwidths to match and are important for a wide array of current and proposed NASA cosmology and physics missions. The IR-blocking aerogel scattering optical filters of the present invention are needed to minimize the heat load on receiver cryogenic systems, stabilizing the instrument and extending mission lifetime. Future instruments require that they do so over increasingly larger apertures, while maintaining high in-band transmission. These missions will require rejection of far-IR power at better than 1 part in $10_6$ and optical/near-IR power at better than 1 part in $10_{12}$. In addition, some imager configurations envisioned for a cosmic microwave background (CMB) mission will have massively multichroic pixels with up to 8 bands per pixel.

In one embodiment, an optical filter includes: an aerogel substrate; and a plurality of particles incorporated in the aerogel substrate; wherein the plurality of particles diffusely scatter infrared radiation above a predetermined tunable cutoff frequency.

In one embodiment, the aerogel substrate is made from one of silica or polyimide.

In one embodiment, a density of said aerogel substrate is in a range of 90 to 212 $mg/cm_3$.

In one embodiment, a size distribution and a loading density of the plurality of particles are selected to achieve the tunable cutoff frequency.

In one embodiment, a size distribution of the plurality of particles is as much as 100 µm.

In one embodiment, the loading density of the plurality of particles in the aerogel substrate range from 3 $mg/cm_3$ to 200 $mg/cm_3$.

In one embodiment, the plurality of particles are one of silicon or diamond.

In one embodiment, the infrared radiation above the tunable cutoff frequency is one of rejected at greater than 25 dB or has less than 0.3% transmission.

In one embodiment, a scattering cross-section of said plurality of particles increases as a wavelength of light approaches a size of one of said plurality of particles, s.

In one embodiment, an index of refraction n of the aerogel substrate with the plurality of particles, is in a range of 1.04 to 1.21.

In one embodiment, the index of refraction n of the aerogel substrate with the plurality of particles is less than 1.10.

In one embodiment, reflections at a surface of the optical filter is less than 0.1% such that the surface is devoid of an anti-reflective coating.

In one embodiment, the tunable cutoff frequency includes a more than 99% transmission across an ultra-broadband frequency ranging from zero to 10 THz.

In one embodiment, the polyimide aerogel substrate includes a plurality of polyimide oligomer backbones, including a plurality of anhydride terminated poly(amic acid) oligomers which are formed in solvent using a molar ratio of dianhydrides to diamines of (n+1) to n, where n is a formulated number of repeat units in said plurality of poly(amic acid) oligomers.

In one embodiment, a cross-linker with a plurality of amine groups is used to cross-link each of the plurality of poly(amic acid) oligomers to form a network structure.

In one embodiment, the plurality of particles are dispersed in a solution of each of the plurality of poly(amic acid) oligomers before the cross-linking.

In one embodiment, the solution of each of the poly(amic acid) oligomers are imidized and a gel film is created, and the gel film is dried using supercritical fluid extraction.

In one embodiment, the optical filter is used in any of far-infrared, millimeter and sub-millimeter space instruments, and ground-based and balloon-borne instruments.

In one embodiment, a method of manufacturing an optical filter, includes: providing an aerogel substrate; incorporating a plurality of particles in the aerogel substrate; and diffusely scattering infrared radiation above a predetermined tunable cutoff frequency using the plurality of particles.

In one embodiment, the method further includes selecting a size distribution and a loading density of the plurality of particles to achieve the tunable cutoff frequency.

In one embodiment, the method further includes: providing the polyimide aerogel substrate in a plurality of polyimide oligomer backbones, including forming a plurality of anhydride terminated poly(amic acid) oligomers in a solvent using a molar ratio of dianhydrides to diamines of (n+1) to n, where n is a formulated number of repeat units in the poly(amic acid) oligomers.

In one embodiment, one polyimide oligomer formulation of the plurality of the polyimide oligomer backbones was made from 9% w/w polymer concentration, using biphenyl-3,3',4,4',-tetracarboxylic dianhydride (BPDA) as a dianhydride, the combination of 50 mol % 2,2'-dimethylbenzidine (DMBZ) and 50 mol % 4,4'-oxydianiline (ODA) as a diamine to make random polyimide oligomers, and 3,5-triaminophenoxybenzene (TAB) as a cross-linker; and another polyimide oligomer formulation of the plurality of polyimide oligomer backbones was made from 10% w/w polymer concentration, using the BPDA as the dianhydride, a combination of 4,4'-bis(4-aminophenoxy) biphenyl (BAPB) and the DMBZ as diamine, and the TAB as the cross-linker.

In one embodiment, the method further includes dispersing the plurality of particles in a solution of each of the plurality of poly(amic acid) oligomers before the cross-linking.

In one embodiment, the method further includes imidizing the solution of each of the plurality of poly(amic acid) oligomers to create a gel; and drying the gel into a gel film and peeling the gel film from a carrier film using supercritical fluid extraction.

In one embodiment, the method further includes fabricating the aerogel substrate with the incorporated plurality of particles in rolls up to 45 cm wide.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized in designing of other structures, methods and systems for carrying out the several purposes of the present invention. It is important, therefore, that the claims are regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to broadband and tunable IR-blocking optical filters for millimeter and sub-millimeter astronomy composed of small scattering particles embedded in an aerogel substrate. The particles are made to diffusely scatter IR radiation to a wide range of angles to maximize the sensitivity of millimeter (mm) and sub-millimeter instruments for use in space missions.

In one embodiment, the aerogel optical filters of the present invention can be produced with embedded high-resistivity silicon powder scattering particles at a 40-cm diameter to enable large-aperture cryogenic receivers for cosmic microwave background polarimeters, which require large arrays of sub-Kelvin detectors in their search for the signature of an inflationary gravitational wave background.

In the present invention, the size of the scattering particles included in the aerogel filters, can be tuned to give variable cutoff frequencies. Since the fundamental limit on the highest frequency that the aerogel scattering filters of the present invention can be transmissive, is set by the typical pore size of the aerogels, which is around 10-30 nm, this allows their use at far higher frequencies than THz.

In one embodiment, the aerogel scattering optical filters of the present invention have ultra-low density and index of refraction (typically n=1.10-1.15), removing the need for anti-reflection (AR) coatings that limit bandwidth and increase filter complexity.

Figure 5:
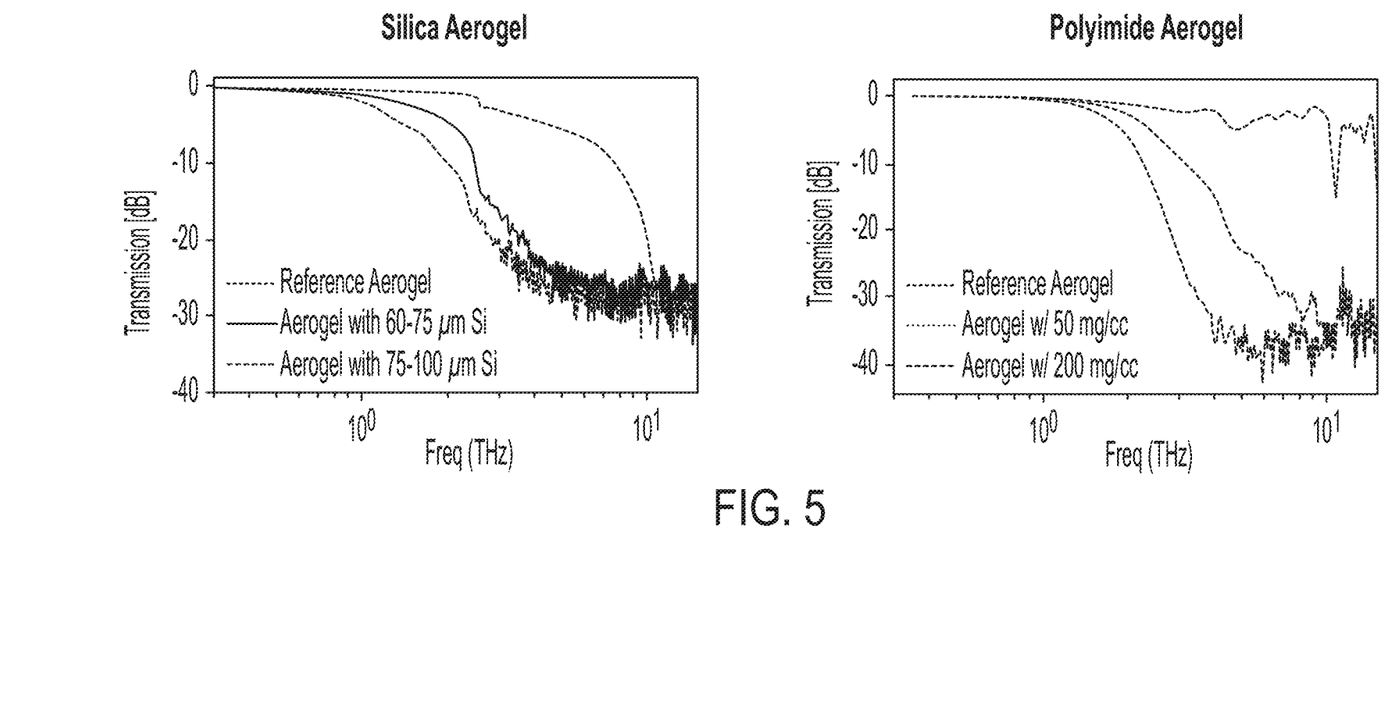
FIG. 5 is a graph showing the measured transmission spectra of: 1) a silica aerogel according to one embodiment consistent with the present invention, and 2) a polyimide aerogel according to another embodiment consistent with the present invention.

In one embodiment, the ultra-low-density (e.g., 90-212 mg/cm$_3$, and typically <150 mg/cm$_3$) aerogel substrate of the present invention, provides a measured index of refraction as low as n=1.04 (with a range of 1.04-1.21, see FIG. 3, for example), removing the need for anti-reflection (AR) coatings and allowing for high transmission across an ultra-broad band from zero (0) frequency (i.e., direct current (DC)) to above 1 THz, and as much as 10 THz, see FIG. 5), or more.

In one embodiment, the aerogels of the present invention are produced by supercritical drying of gels, typically using carbon dioxide, which allows liquid to be removed from the gel without destroying its solid matrix, leaving behind a low-density nano-porous skeleton with high strength-to-weight ratio and low thermal conductivity.

Aerogel Scattering Optical Filters

In one embodiment, aerogel materials used for the optical filters of the present invention include classic silica aerogel, and in another embodiment, a flexible and mechanically robust polyimide aerogel made with a plurality of different polyimide oligomer backbones—with suitable scattering particles such as those made of silicon, diamond, etc. The exemplary silica and polyimide aerogel materials are ideal substrates for the aerogel scattering filters of the present invention, providing a unique combination of low index of refraction, low microwave loss, mechanical robustness, and, in the case of polyimide aerogel, flexibility that is unmatched.

The aerogel scattering filters of the present invention are designed and fabricated to be capable of high transmission across all frequencies below 10 THz (see FIG. 5), with excellent rejection of IR radiation above a tunable cutoff frequency. This is achieved by the novel method of embedding scattering particles in an aerogel medium.

In one embodiment of the present invention, the size distribution of the scattering particles of the aerogel scattering filter can be chosen to provide a tunable cutoff frequency depending on the specific application.

In one embodiment, the low density of aerogels gives them a correspondingly low index of refraction (i.e., n=1.04). This reduces reflections at the surface of the aerogel scattering filter of the present invention to negligible levels (<0.1%), making anti-reflective (AR) coatings, which reduce the achievable bandwidth and increase the complexity of a filter, unnecessary.

In the present invention, the scattering cross-section of the particles increases dramatically as the wavelength of light approaches the size of the particle, s. For wavelengths λ»s, the aerogel scattering optical filter of the present invention acts as an effective homogeneous dielectric, whereas for wavelengths λ≲s the optical filter scatters light strongly to large angles. The resulting low emissivity of the aerogel scattering optical filter of the present invention reduces heating in the center of the optical filter and re-radiation down the optical chain.

Figure 1:
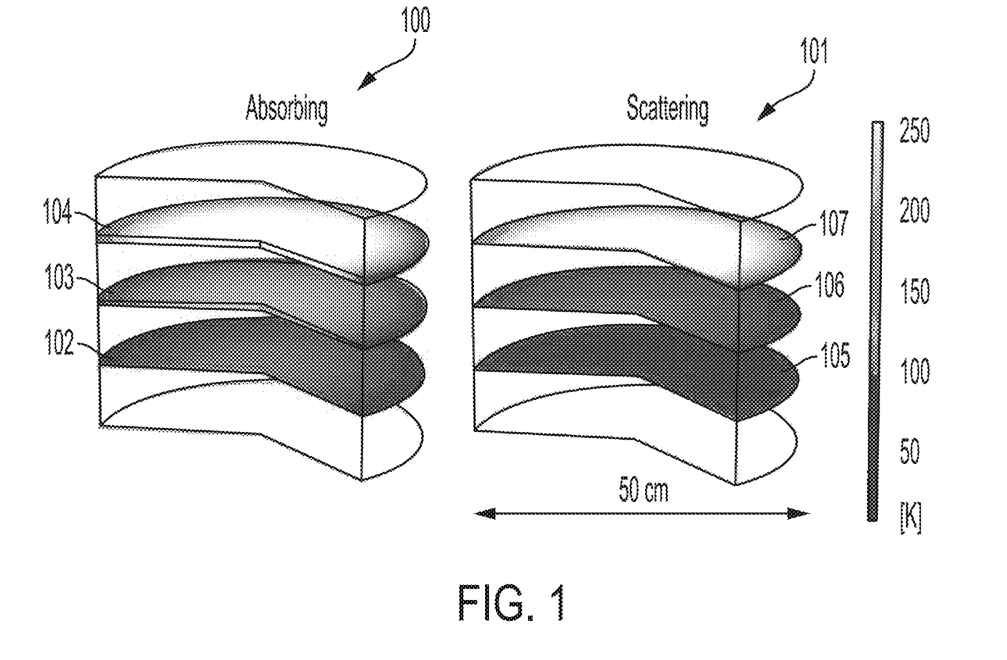
FIG. 1. is a drawing depicting a prior art absorbing optical filter and a scattering aerogel optical filter according to one embodiment consistent with the present invention.

In order to show the clear advantage of having low-emissivity surfaces provided by the aerogel scattering optical filters of the present invention, the design was modeled in an experiment conducted on absorptive and scattering filter stacks 100, 101, respectively, as shown in FIG. 1. In the simulation experiment, the temperature scales were identical and ranged from 4 K to 240 K for both the absorptive filter stack 100 and the scattering filter stack 101. The experimental setup included absorptive filter stack 100 and scattering filter stack 101, each with three filters 102-104, 105-107, respectively, with blackbody emitters (not shown) of 250 K above, 60 K to the sides, and 4 K below.

The results of the modeled experiment showed that the aerogel scattering filter stack's 101 low emissivity allowed the cavities between the filters 105-107 to equilibrate closer to the side wall temperature, reducing the filter stack 101 temperature at the center. Thus, not only does the bottom scattering filter 105 settle to a lower temperature in the simulation, but also its low emissivity further reduces loading down the cryogenic chain compared with the absorptive filter 102, from 8 W to <0.1 W in this example.

Optical Design

A. Low-Frequency Performance

Figure 2:
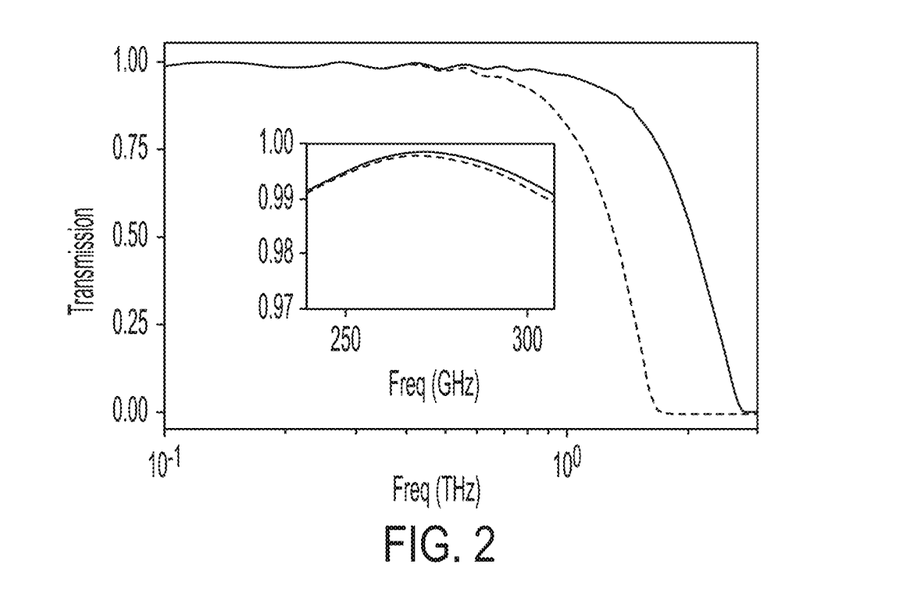
FIG. 2 is a graph showing the transmission vs. the frequency for a 1 mm thick polyimide aerogel scattering optical filter with two size distributions of silicon scattering particle, according to one embodiment consistent with the present invention.

The response of the aerogel optical filter of the present invention was modeled using a combination of effective-dielectric and Mie scattering theory. As shown in FIG. 2, the modeled estimates of optical filter transmission versus frequency, for exemplary 1 mm thick polyimide aerogel scattering filters with two size distributions of silicon scattering particles, 20-30 µm (solid line) and 40-50 µm (dashed line), were performed to show the ability to tune filter cutoff. The modeled silicon loading density was 90 mg/cm$_3$. The results showed >99% transmission for a typical observing band with 25% bandwidth.

The results of the modeling of the aerogel filter of the present invention found that for wavelengths that are large compared to the scattering particle size and separation, the aerogel plus scatterers of the present invention will behave as a composite material of air, the aerogel matrix material, and silicon. The aerogel without scatterers will have an approximate effective dielectric constant given by Maxwell-Garnett theory of:

$$\epsilon_a = \frac{\epsilon_m + 2 = +2f_a(\epsilon_m - 1)}{\epsilon_m + 2 - f_a(\epsilon_m - 1)} \quad \text{(Eq. 1)}$$

where $\epsilon_a$ and $\epsilon_m$ are the dielectric constants of the aerogel and the aerogel matrix material, respectively, and $f_a$ is the volume filling fraction of material in the aerogel.

Thus, the nano-porous structure of typical aerogels allows them to serve as low-filling-fraction dielectrics well into the IR and on length scales associated with the scattering particles used in the modeled aerogel filters of the present invention (>1 µm).

In the present invention, the inclusion of a small filling fraction of scattering particles increases the dielectric constant. For the small filling fractions ($\lesssim$10%) used in the scattering filters of the present invention, it is valid to calculate an effective dielectric constant for the base aerogel and then use Maxwell-Garnett theory again to calculate a new effective dielectric constant:

$$\epsilon = \epsilon_a \frac{\epsilon_s + 2\epsilon_a = +2f_s(\epsilon_s - \epsilon_a)}{\epsilon_s + 2\epsilon_a - f_s(\epsilon_s - \epsilon_a)} \quad \text{(Eq. 2)}$$

where $\epsilon_a$ is the aerogel dielectric constant calculated from Eq. 1, $\epsilon_s$ is that of the scattering particles, and fs is the volume filling fraction of the scattering particles in the medium.

At frequencies where the materials involved do not exhibit high absorption, the Maxwell-Garnett formulas (Eq. 1 and Eq. 2 above) can be used to estimate loss in the aerogel optical filters of the present invention by inserting complex dielectric constants for the materials.

The reflection at normal incidence for a film of the present invention with a thickness t is calculated according to standard methods.

$$R = 2r_2(1+\cos_2\beta)/(1+r_4+2r_2\cos_2\beta)$$

where $$r = (\bar{n} - 1)/(\bar{n} + 1) \text{ for } \bar{n} = \sqrt{\text{Re}(\bar{\epsilon})},$$

where the final equality is approximately true when $\text{Im}(\bar{\epsilon}) \ll \text{Re}(\bar{\epsilon})$, a valid approximation for our materials. $\beta = 2\pi v \bar{n} t/c$ is the phase delay in the material at frequency v.

For small r, the total reflectance exhibits fringes between 0 and $4r_2$. The aerogels of the present invention have indices of refraction n, measured in the range n=1.04-1.16 (see FIG. 3 and below for results of modeling). For a material in the middle of this range with $\bar{n}=1.10$, the maximum reflectance is 0.9% and the average reflectance across all frequencies is <0.5%. For a narrow bandwidth measurement, one of ordinary skill in the art could choose an optical filter thickness for a given observing band which can reduce reflections from the filter to levels of 0.1%.

B. Scattering at High Frequency

Optical scattering theory has been developed extensively and the scattering of light from spherical particles can be solved analytically. The scattered intensity can be expanded as a sum of Bessel functions and depends on the ratio between the size of the spherical particle and the wavelength of light, as well as the scattered direction and indices of refraction of the medium and the scatterers.

For a medium containing many small scatterers, transmission through the medium can be shown to depend solely on the forward-scattered amplitude, $Q_{sca}$. The specific intensity of light passing through a medium of scatterers is attenuated as:

$$I(z) = I_0 \exp(-N\pi\alpha_2 Q_{sca} z) = I_0 \exp(-yz), \quad \text{(Eq. 3)}$$

where N is the volume density of scatterers, $\alpha$ is the particle radius, and z is the distance traveled through the medium. The attenuation coefficient has been defined as $y = N\pi\alpha_2 Q_{sca}$.

The attenuation through a scattering medium with a distribution of sizes can be straightforwardly handled by integrating over the particle size. If the number of scatterers per unit volume is a function of particle radius, N(a), then the attenuation coefficient is:

$$\gamma = \int_0^\infty N(a)\pi a 2 Q_{sca}(a)(da) \quad \text{(Eq. 4)}$$

Using this model, the frequency cutoff of the aerogel optical filters of the present invention could be estimated using limitations of the particles being approximated as randomly-oriented nearly spherical particles, which is particularly relevant for long wavelengths, and noting that scattering is not strong enough for multiple scattering events to play a significant role.

C. Integrated Model

The complex dielectric constant estimated from Maxwell-Garnett theory in section A above, can be combined with the additional attenuation, y, estimated from Mie scattering theory in section B above. The attenuation due to scattering contributes to the complex part of the dielectric constant to give a total effective dielectric constant of:

$$\epsilon_{eff} = \text{Re}(\bar{\epsilon}) + i\left(\text{Im}(\bar{\epsilon}) + \frac{c\gamma}{2\pi n v}\right) \quad \text{(Eq. 5)}$$

where the first term in parentheses arises from the intrinsic loss of the materials in the filter and the second term is extrinsic loss from scattering due to the geometry of the scattering particles.

This dielectric constant can then be incorporated into a transfer-matrix code for calculation of the expected transmission spectrum of a given filter of the present invention. As shown in FIG. 2, the exemplary model outputs for polyimide aerogel filters 1 mm thick with silicon particles embedded at a density of 3 $mg/cm_3$ (size distribution 50-75 μm) and 5 $mg/cm_3$ (size distributions 75-100 μm), are used to tune filter cutoff and show more than 99% transmission for a typical observing band with 25% bandwidth, and to guide filter fabrication parameters.

Aerogel Optical Filter Fabrication

In one embodiment, the aerogel scattering optical filters of the present invention are fabricated by embedding small scattering particles in an aerogel substrate. The aerogels are produced by supercritical drying of gels, typically using carbon dioxide, which allows liquid to be removed from the gel without destroying its solid matrix, leaving behind a low-density nano-porous skeleton with high strength-to-weight ratio and low thermal conductivity.

High-quality optical filters of the present invention can be made from a variety of suitable compositions, with some aerogels being fabricated from silica, and from polyimide, for example, and the scattering particles disposed therein being made from silicon or diamond or any suitable material. However, one of ordinary skill in the art would choose both a suitable aerogel substrate material and scattering particle composition which best achieves the requisite features of the present invention, such as, high transmission across all frequencies below 10 THz, and excellent rejection of IR radiation above a tunable cutoff frequency.

In one embodiment, the aerogel optical filters with scattering particles of the present invention, were fabricated using 90 mg/cc silica ($SiO_2$) aerogel with ultrapure, float-zone silicon powder scatterers, which demonstrated a broad passband with no fringing at low frequencies, a rejection of IR power at greater than 25 dB for frequencies above the cutoff (i.e., less than 0.3% transmission), and the ability to tune the cutoff frequency by choosing the distribution of particle size.

Although high-quality optical filters made from silica aerogel can be fabricated, in one embodiment, large-diameter aerogel optical filters of the present invention can be manufactured using polyimide, which is mechanically strong and flexible, while maintaining a low index of refraction (typically n<1.10) and loss tangent (tan $\delta$<2×$10_{-3}$).

The polyimide aerogels of the present invention were fabricated in rolls of up to 45 cm wide using well-known roll-to-roll techniques, making the polyimide aerogel optical filters good candidates for large-format optical filters. The polyimide aerogel optical filters demonstrated strong IR rejection and high microwave transmission according to experiments conducted as discussed below.

More specifically, in one embodiment, Polyimide 1 oligomers of the aerogel optical filter of the present invention were formulated using N-methylpyrolidone (NMP) by using 26 equivalents of dianhydride and 25 equivalent diamine. Polyimide 1 was made from 9% w/w polymer concentration, using biphenyl-3,3',4,4',-tetracarboxylic dianhydride (BPDA) as dianhydride, the combination of 50 mol % 2,2'-dimethylbenzidine (DMBZ) and 50 mol % 4,4'-oxydianiline (ODA) as diamine to make random polyimide oligomers, and 3,5-triaminophenoxybenzene (TAB) as cross-linker.

In one embodiment, Polyimide 2 of the aerogel optical filter of the present invention was made from 10% w/w polymer concentration, using BPDA as dianhydride, the combination of 4.4'-bis(4-aminophenoxy) biphenyl (BAPB) and DMBZ as diamine, and TAB as cross-linker.

In one embodiment, the exemplary particles (i.e., silicon, diamond, etc.) are then incorporated into the desired aerogel (i.e., silica or polyimide).

In one embodiment, with respect to exemplary silicon particles, silicon powder was prepared using a ball mill and sieve set to efficiently grind float-zone silicon wafers (resistivity>10 kΩ-cm) and select the desired range of particle sizes. In one embodiment, sieving after grinding allows for selection of the particle size distribution, which is used to tune the cutoff frequency of the filter.

With respect to silicon or any suitable particles being incorporated into a polyimide aerogel, in one embodiment, the desired scattering particles are dispersed into the poly (amic acid) solution after using TAB and before cross-linking and gelation. A stable suspension of particles is created in the polyamic acid solution that does not settle before gelation can occur. In one embodiment, this can be done by functionalizing the surface of the particles to make them more compatible or even react with the polymer.

In one embodiment, in order to make thin films of polyimide aerogel composite rolls in a roll-to-roll process, the solution with silicon particles was cast to a carrier plastic film using a Doctor blade to control the thickness to a uniform thickness.

In one embodiment, acetic anhydride and triethyleneamine were used to chemically imidize the polyamic acids at room temperature. In one embodiment, the network structure is then imidized to create a gel. Then, in one embodiment, the gel film is peeled away from the carrier film and taken through the supercritical drying process. In one embodiment, the gels are then dried using supercritical fluid extraction of, typically, $CO_2$ to produce the aerogel.

The properties of the resulting polyimide aerogel particle composite film of the present invention are characterized by the polyimide backbone structure, the concentration of the solution before gelation, particle sizes and the amount of particle loading.

Samples Fabricated

Figure 3:
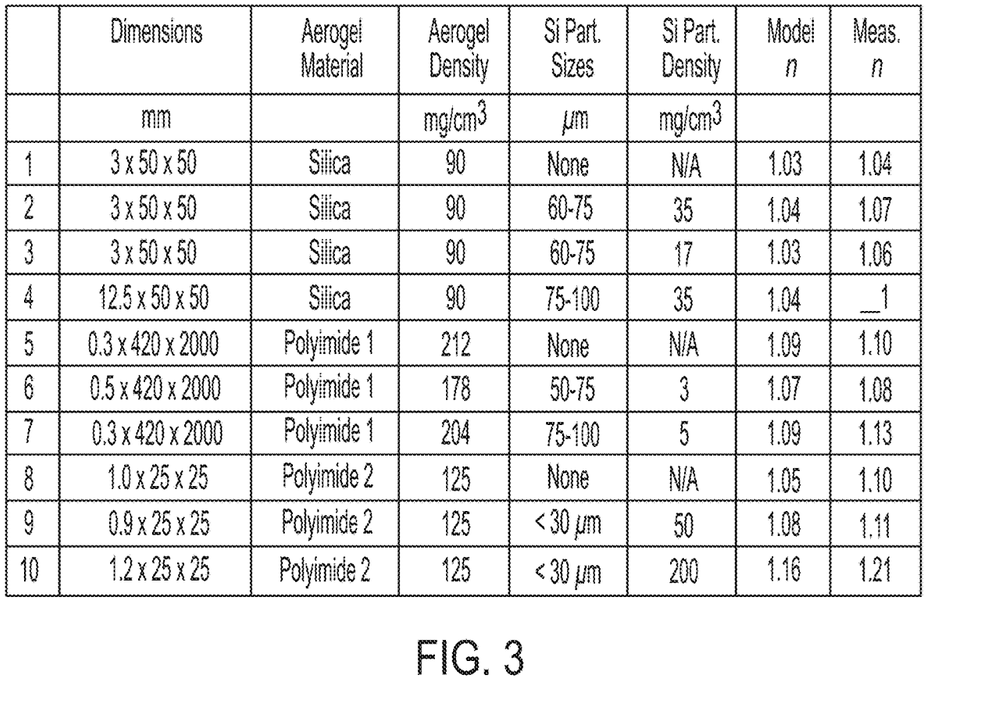
FIG. 3 is a Table showing physical characteristics of silica and polyimide aerogel scattering optical filters manufactured in various embodiments consistent with the present invention, and the modeled index of refraction n compared to the measured index of refraction n, assuming n of 1.7, 2.0, and 3.4 for polyimide, silica and silicon respectively.

In order to show that the modeled results are achievable during manufacturing, in one embodiment, as shown in the Table of FIG. 3, an exemplary embodiment of silica aerogels were produced in a preferred base density of 90 $mg/cm_3$ (Samples 1-4), with a loading of 60-75 μm, (Samples 2 and 3) and 75-100 μm (Sample 4) silicon particle size distributions at a density of 35 $mg/cm_3$ (Samples 2 and 4) and 17 $mg/cm_3$ (Sample 3). The samples were produced in sizes of 3 mm×50 mm×50 mm (Samples 1-3), and 12.5 mm×50 mm×50 mm (Sample 4). Sample 1 was a reference aerogel with no silicon scattering particles.

In one embodiment, exemplary embodiments of polyimide aerogels were produced in two polymer oligomer backbones.

In one embodiment, Polyimide 1 aerogel was produced with a nominal base aerogel density of approximately 200 mg/cm$_3$ (i.e., 212 mg/cm$_3$ for Sample 5, 178 mg/cm$_3$ for Sample 6, and 204 mg/cm$_3$ for Sample 7) in rolls 420 mm×2000 mm in thickness 0.3 mm with silicon loading of 3 mg/cm$_3$ (Sample 6), thickness 0.5 mm with silicon loading of 5 mg/cm$_3$ (Sample 7), and with particle size distributions of 50-75 μm (Sample 6) and 75-100 μm (Sample 7). Sample 5 was a reference aerogel with no silicon scattering particles.

In one embodiment, Polyimide 2 aerogel oligomers were produced by the same procedure as Polyimide 1 except that instead of using 50 mol % ODA and forming random polyimide oligomers, 50 mol % BAPB was reacted with BPDA first then 50 mol % DMBZ was added later to form alternated polyimide oligomers.

In one embodiment, Polyimide 2 aerogel was made in smaller coupons 25 mm×25 mm with thicknesses of approximately 1.0 mm (i.e., 1.0 mm (Sample 8), 0.9 mm (Sample 9), and 1.2 mm (Sample 10)), a silicon loading of 50 mg/cm$_3$ (Sample 9) and 200 mg/cm$_3$ (Sample 10), a nominal base aerogel density of approximately 125 mg/cm$_3$ (Samples 8-10) and particle size distribution of <30 μm (Samples 9 and 10). Sample 8 was a reference aerogel that contained no silicon scattering particles. These samples were produced with increased silicon scatterer density to increase IR rejection and improve mm-wave transmission using a different polyimide aerogel formulation, namely Polyimide 2.

Test Equipment and Results

In one embodiment, transmission and reflection data were taken of the samples in the Table of FIG. 3, to evaluate their performance. The silica aerogel samples were measured in transmission using a time-domain THz spectroscopy system for frequencies 0.15-1.5 THz and Bruker Fourier transform spectrometer (FTS) for transmission at frequencies of 1.5-200 THz.

In the experiment, polyimide aerogel samples were measured using a Bruker FTS for infrared transmission across frequencies 1-18 THz and a quasi-optical vector network analyzer (VNA) setup at W band (75-110 GHz). VNA reflectance measurements were taken multiple (~5) times with sample positions translated by approximately λ/5 each time, following known methods.

Figure 4:
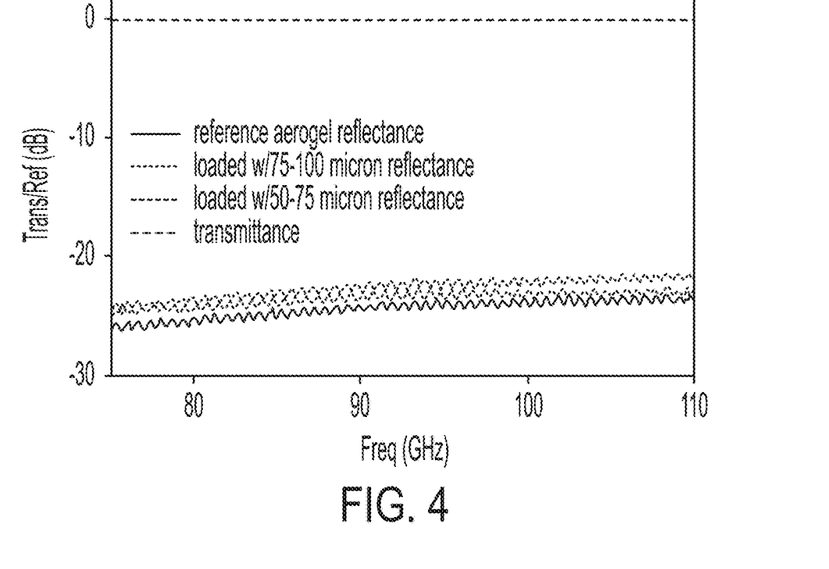
FIG. 4 is a graph showing vector network analyzer (VNA) measurements of microwave reflectance and transmittance of polyimide aerogel samples according to various embodiments consistent with the present invention.

The results of the experiment are shown in FIG. 4. Specifically with respect to the polyimide aerogel, FIG. 4 shows measurements of the reflectance and transmittance of Polyimide 1 aerogel samples with no silicon powder (reference aerogel Sample 5), with aerogel loaded with 3 mg/cm$_3$ density and 50-75 μm silicon powder particle size, (Sample 6), and loaded with 5 mg/cm$_3$ density and 75-100 μm silicon powder particle size (Sample 7).

FIG. 4 shows that the measurements of the polyimide aerogel samples with the VNA setup demonstrated high transmission (>99%) and low reflection (~−25 dB or less than 0.3% transmission) at W band (75-110 GHz).

Further, the results showed that the small-scale samples exhibited high microwave and sub-mm transmission, strong IR rejection, transmission up to 10 THz, with the silicon-loaded Samples 6-7 exhibiting tunable cutoff frequency. The measurements in the graph of FIG. 4 shows that silicon loading does not significantly increase microwave reflection or scattering, as evidenced by the loaded samples (Samples 6-7) having transmission and reflection nearly identical to the reference aerogel (Sample 5).

As shown in FIGS. 3-4, the measured index of refraction in for Samples 5-7 were 1.10-1.13, which were low and close to the modeled n of 1.07-1.09. The measurements showed that silicon loading did not significantly increase microwave reflection or scattering, as the loaded aerogel filters Samples 6 and 7 had transmission and reflection nearly identical to the reference aerogel filter Sample 5.

Thus, the transmission spectra of the aerogel scattering filters of the present invention demonstrated the novel combination of a high transmission across a wide band, extremely broadband IR blocking, with a tunable cutoff frequency achieved by choice of silicon loading density and particle size distribution, with all tunable frequencies above the cutoff frequency of the filter being rejected at >25 dB (i.e., less than 0.3% transmission).

In more results for the samples of silica aerogels, as shown in FIG. 5, the transmission spectra of reference of FIG. 3 samples—i.e., Sample 1 of silica aerogel with no silicon powder, Sample 2 with distribution of 60-75 μm and Sample 4 with distribution of 75-100 μm silicon particles— showed the ability to tune the cutoff frequency using the particle size distribution. Further, the results showed that the silica aerogel reference Sample 1 transmits extremely well to 3 THz.

As shown in FIG. 3, the measured index of refraction n for Samples 1-3 were 1.04-1.06, which were low and close to the modeled n of 1.03-1.04. The measurements showed that, like with polyimide aerogels, silicon loading did not significantly increase microwave reflection or scattering, as the loaded aerogel filters Samples 2-4 had transmission and reflection nearly identical to the reference aerogel filter Sample 1.

Aerogel Optical Filter Applications

IR-blocking optical filters are important components of millimeter, sub-millimeter, and far-IR telescopes. IR-blocking filters are essential for reducing thermal loading on the cold stages of these instruments and eliminating "blue leak," sensitivity to unwanted sources of radiation at high frequency. In addition to the thermal benefits, the aerogel scattering optical filter technology of the present invention allows for adjustment and customization of the cut-on frequency of suppression depending on the instrument band of interest.

The lightweight aerogel scattering optical filters of the present invention are unique in providing high (>99%) transmission across a broad passband and strong, uniform rejection of IR power above a tunable cutoff frequency. The low IR emissivity of these filters allows them to effectively block IR radiation without excessive filter heating and subsequent re-radiation in the instrument passband. These qualities combine to allow aerogel scattering optical filters to increase instrument sensitivity at the same time as reducing overall payload mass and eliminating the complexity inherent in anti-reflection coatings.

The aerogel optical filters of the present invention are used as novel infrared-blocking optical filters, a key supporting technology for future microwave, sub-millimeter, and far-IR space missions. The filter technology of the present invention could be used by future ground-based, balloon-borne, and space CMB polarization missions, as well as other microwave, sub-mm, and infrared instruments. Aerogel scattering optical filters will enable these experiments by providing unprecedented rejection of thermal/IR radiation necessary to reduce the heat loads reaching the instruments' focal planes while maintaining high transmission throughout the mm, sub-mm, and far-IR bands below the cutoff frequency.

CONCLUSION

The present invention is directed to a broadband, IR-blocking optical filter achieved by the novel embedding of scattering particles in an aerogel medium. In one embodiment, the size of the scattering particles is chosen to be large compared to IR wavelengths, causing strong scattering at high frequencies, but small compared with the wavelengths of interest, allowing high transmission in the passband. While scattering filters have been made before, using aerogel as the embedding medium is novel.

The IR blocking optical filters of the present invention are composed of ultra-low index of refraction aerogel substrates with embedded scattering particles of a suitable type such as silicon or diamond. In one embodiment, the base aerogel substrate can be made from silica or polyimide, or other suitable material, and were fabricated and tested for transmission and reflection at millimeter and far-IR wavelengths.

The results of testing showed that the aerogel scattering optical filters of the present invention have: 1) high (>99%) transmission across an ultra-broad bandwidth from DC to 1 THz, and up to 10 THz or higher, 2)>25 dB rejection of IR power, and 3) a cutoff frequency that is tunable through choice of scattering particle size and loading density.

The IR-blocking aerogel scattering optical filters of the present invention are needed to minimize the heat load on receiver cryogenic systems, stabilizing the instrument and extending mission lifetime. Future instruments require that they do so over increasingly larger apertures, while maintaining high in-band transmission. These missions will require rejection of far-IR power at better than 1 part in $10_6$ and optical/near-IR power at better than 1 part in $10_{12}$. In addition, some imager configurations envisioned for a cosmic microwave background (CMB) mission will have massively multi-chroic pixels with up to 8 bands per pixel.

The aerogel scattering optical filters of the present invention provide a unique capability that currently does not exist and will produce IR-blocking filters capable of enabling a variety of instruments from millimeter to infrared wavelengths, including for a cosmic background radiation polarization satellite (CMBPol). The unique combination of ultra-low density, high in-band throughput, tunable cutoff frequency, and high IR rejection offered by aerogel scattering optical filters of the present invention enhance the sensitivity of space instruments and open up new instrument configurations. No IR-blocking filter technology in use today provides the combination of high transmission across a wide band, broadband IR rejection, and tunable cutoff frequency achievable with the present aerogel scattering optical filters.

In sum, the aerogel scattering optical filters of the present invention offer a number of advantages over current filter technologies, including, but not limited to: 1) high in-band transmission, afforded by the low index of refraction n of aerogels, 2) a broad passband with low ripple, provided by the low index of refraction n and corresponding lack of anti-reflection (AR) coating, 3) a tunable cutoff frequency, set by the scattering particle size and loading density, 4) strong, uniform rejection of IR radiation above the cutoff frequency with no "blue leaks", 5) a large format afforded by the strong and flexible polyimide-type aerogel substrate and roll-to-roll processing, 6) lightweight construction due to the ultra-low density of aerogels, and 7) cryogenic compatibility, where large-scale polyimide aerogel samples have been successfully cryogenically cycled to 60 K with no damage.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. An optical filter, the optical filter comprising:
an aerogel substrate; and
a plurality of particles incorporated in said aerogel substrate,
wherein said plurality of particles diffusely scatter infrared radiation above a predetermined tunable cutoff frequency,
wherein said plurality of particles are one of silicon or diamond, and
wherein said aerogel substrate is made from polyimide, said polyimide aerogel substrate includes a plurality of polyimide oligomer backbones, including a plurality of anhydride terminated poly(amic acid) oligomers which are formed in solvent using a molar ratio of dianhydrides to diamines of (n+1) to n, where n is a formulated number of repeat units in said plurality of poly(amic acid) oligomers, wherein a density of said aerogel substrate is in a range of 90 to 212 mg/cm³, wherein a size distribution and a loading density of said plurality of particles are selected to achieve said tunable cutoff frequency, wherein said size distribution of said plurality of particles is as much as 100 μm, wherein said loading density of said plurality of particles in said aerogel substrate range from 3 mg/cm³ to 200 mg/cm³.

2. The optical filter of claim 1, wherein said infrared radiation above said tunable cutoff frequency is one of rejected at greater than 25 dB or has less than 0.3% transmission.

3. The optical filter of claim 1, wherein the optical filter is used in any of far-infrared, millimeter and sub-millimeter space instruments, and ground-based and balloon-borne instruments.

4. The optical filter of claim 1, wherein a cross-linker with a plurality of amine groups is used to cross-link each of said plurality of poly(amic acid) oligomers to form a network structure.

5. The optical filter of claim 4, wherein said plurality of particles are dispersed in a solution of each of said plurality of poly(amic acid) oligomers before said cross-linking.

6. The optical filter of claim 5, wherein said solution of each of said poly(amic acid) oligomers are imidized and a gel film is created, and
wherein said gel film is dried using supercritical fluid extraction.

7. The optical filter of claim 1, wherein a scattering cross-section of said plurality of particles increases as a wavelength of light approaches a size of one of said plurality of particles, s.

8. The optical filter of claim 7, wherein an index of refraction n of said aerogel substrate with said plurality of particles, is in a range of 1.04 to 1.21.

9. The optical filter of claim 8, wherein said index of refraction n of said aerogel substrate with said plurality of particles is less than 1.10.

10. The optical filter of claim 9, wherein reflections at a surface of the optical filter is less than 0.1% such that said surface is devoid of an anti-reflective coating.

11. The optical filter of claim 10, wherein said tunable cutoff frequency includes a more than 99% transmission across an ultra-broadband frequency ranging from zero to 10 THz.

12. A method of manufacturing an optical filter, the method of manufacturing an optical filter comprising:
providing an aerogel substrate;
incorporating a plurality of particles in said aerogel substrate; and
diffusely scattering infrared radiation above a predetermined tunable cutoff frequency using said plurality of particles, wherein said plurality of particles are one of silicon or diamond and wherein said aerogel substrate is made from polyimide,
providing said polyimide aerogel substrate in a plurality of polyimide oligomer backbones, including forming a plurality of anhydride terminated poly(amic acid) oligomers in a solvent using a molar ratio of dianhydrides to diamines of (n+1) to n, where n is a formulated number of repeat units in said poly(amic acid) oligomers.

13. The method of claim 12, wherein the optical filter is used in any of far-infrared, millimeter and sub-millimeter space instruments, and ground-based and balloon-borne instruments.

14. The method of claim 12, wherein one polyimide oligomer formulation of said plurality of said polyimide oligomer backbones was made from 9% w/w polymer concentration, using biphenyl-3,3',4,4',-tetracarboxylic dianhydride (BPDA) as a dianhydride, the combination of 50 mol % 2,2'-dimethylbenzidine (DMBZ) and 50 mol % 4,4'-oxydianiline (ODA) as a diamine to make random polyimide oligomers, and 3,5-triaminophenoxybenzene (TAB) as a cross-linker; and
wherein another polyimide oligomer formulation of said plurality of polyimide oligomer backbones was made from 10% w/w polymer concentration, using said BPDA as said dianhydride, a combination of 4.4'-bis (4-aminophenoxy) biphenyl (BAPB) and said DMBZ as diamine, and said TAB as said cross-linker.

15. The method of claim 14, wherein said cross-linker with a plurality of amine groups is used to cross-link each of said plurality of poly(amic acid) oligomers to form a network structure.

16. The method of claim 15, the method further comprising:
dispersing said plurality of particles in a solution of each of said plurality of poly(amic acid) oligomers before said cross-linking.

17. The method of claim 16, the method further comprising:
imidizing said solution of each of said plurality of poly (amic acid) oligomers to create a gel; and
drying said gel into a gel film and peeling said gel film from a carrier film using supercritical fluid extraction.

18. The method of claim 17, the method further comprising:
fabricating said aerogel substrate with said incorporated plurality of particles in rolls up to 45 cm wide.

19. The method of claim 12, wherein a density of said aerogel substrate is in a range of 90 to 212 mg/cm$^3$.

20. The method of claim 19, the method further comprising:
selecting a size distribution and a loading density of said plurality of particles to achieve said tunable cutoff frequency.

21. The method of claim 20, wherein said infrared radiation above said tunable cutoff frequency is one of rejected at greater than 25 dB or has less than 0.3% transmission.

22. The method of claim 20, wherein said size distribution of said plurality of particles is as much as 100 μm.

23. The method of claim 22, wherein said loading density of said plurality of particles in said aerogel substrate range from 3 mg/cm$^3$ to 200 mg/cm$^3$.

24. The method of claim 20, wherein a scattering cross-section of said plurality of particles increases as a wavelength of light approaches a size of one of said plurality of particles, s.

25. The method of claim 24, wherein an index of refraction n of said aerogel substrate with said plurality of particles, is in a range of 1.04 to 1.21.

26. The method of claim 25, wherein said index of refraction n of said aerogel substrate with said plurality of particles is less than 1.10.

27. The method of claim 26, wherein reflections at a surface of the optical filter is less than 0.1% such that the optical filter is devoid of an anti-reflective coating.

28. The method of claim 27, wherein said tunable cutoff frequency includes a more than 99% transmission across an ultra-broadband frequency in a range from zero to 10 THz.

* * * * *